(12) United States Patent
Salvo et al.

(10) Patent No.: US 11,468,528 B2
(45) Date of Patent: Oct. 11, 2022

(54) INTELLECTUAL PROPERTY EXCHANGE ECOSYSTEM FOR ADDITIVE MANUFACTURING

(71) Applicant: General Electric Company, Schenectady, NY (US)

(72) Inventors: Joseph Salvo, Schenectady, NY (US); Benjamin Edward Beckmann, Niskayuna, NY (US); John William Carbone, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 16/641,161

(22) PCT Filed: Aug. 31, 2017

(86) PCT No.: PCT/US2017/049685
§ 371 (c)(1),
(2) Date: Feb. 21, 2020

(87) PCT Pub. No.: WO2019/045738
PCT Pub. Date: Mar. 7, 2019

(65) Prior Publication Data
US 2020/0202467 A1    Jun. 25, 2020

(51) Int. Cl.
*G06Q 50/18* (2012.01)
*G06Q 40/00* (2012.01)
(Continued)

(52) U.S. Cl.
CPC ......... *G06Q 50/184* (2013.01); *B29C 64/386* (2017.08); *B33Y 50/00* (2014.12);
(Continued)

(58) Field of Classification Search
CPC ........... G06Q 50/184; G06Q 10/06315; G06Q 10/083; G06Q 10/087; G06Q 20/065;
(Continued)

(56) References Cited

U.S. PATENT DOCUMENTS 8,271,393 B2   9/2012   Twining et al.
9,608,829 B2   3/2017   Spanos et al.
(Continued)

FOREIGN PATENT DOCUMENTS

JP   2012101443 A   5/2012
JP   2015030578 A   2/2015
(Continued)

OTHER PUBLICATIONS

JP Application No. 2020-511469; Office Action, dated Aug. 23, 2021, pp. 1-8.
(Continued)

*Primary Examiner* — Garcia Ade
(74) *Attorney, Agent, or Firm* — Fletcher Yoder, PC

(57) ABSTRACT

According to some embodiments, a system may include an additive manufacturing platform that provides additive manufacturing capability data. A customer platform, associated with a customer, may transmit an industrial asset item request for an industrial asset item. A digital transaction engine may receive the additive manufacturing capability data and the industrial asset item request. The digital transaction engine may then associate the industrial asset item request with an industrial asset definition file, and, based on the additive manufacturing capability data and the industrial asset definition file, assign the industrial asset item request to the additive manufacturing platform. The assignment of the industrial asset item request may be recorded via a secure, distributed transaction ledger. Responsive to the assignment, the additive manufacturing platform may create
(Continued)

the industrial asset item (e.g., via an additive manufacturing printer) and provide the item to the customer.

22 Claims, 15 Drawing Sheets

(51) Int. Cl.

| | |
|---|---|
| *B33Y 50/00* | (2015.01) |
| *F03D 13/00* | (2016.01) |
| *B64F 5/10* | (2017.01) |
| *B29C 64/386* | (2017.01) |
| *G06F 16/27* | (2019.01) |
| *G06F 16/22* | (2019.01) |
| *G06F 30/10* | (2020.01) |
| *B61D 17/00* | (2006.01) |
| *G06F 21/60* | (2013.01) |
| *G06Q 10/06* | (2012.01) |
| *G06Q 10/08* | (2012.01) |
| *G06Q 20/06* | (2012.01) |
| *G06Q 20/10* | (2012.01) |
| *G06Q 20/12* | (2012.01) |
| *G06Q 50/04* | (2012.01) |
| *B33Y 80/00* | (2015.01) |

(52) U.S. Cl.
CPC ............... *B61D 17/00* (2013.01); *B64F 5/10* (2017.01); *F03D 13/00* (2016.05); *G06F 16/22* (2019.01); *G06F 16/27* (2019.01); *G06F 21/602* (2013.01); *G06F 30/10* (2020.01); *G06Q 10/06315* (2013.01); *G06Q 10/083* (2013.01); *G06Q 10/087* (2013.01); *G06Q 20/065* (2013.01); *G06Q 20/108* (2013.01); *G06Q 20/1235* (2013.01); *G06Q 40/12* (2013.12); *G06Q 50/04* (2013.01); *B33Y 80/00* (2014.12); *G06Q 2220/18* (2013.01)

(58) Field of Classification Search
CPC .. G06Q 20/108; G06Q 20/1235; G06Q 40/12; G06Q 50/04; G06Q 2220/18; G06Q 10/00; G06Q 10/08; G06Q 10/06; G06Q 30/06; B29C 64/386; B33Y 50/00; B33Y 80/00; B61D 17/00; B64F 5/10; F03D 13/00; G06F 16/22; G06F 16/27; G06F 21/602; G06F 30/10; Y02P 90/30; Y02P 90/02; Y02E 10/72; H04L 2209/38
USPC .......................................................... 705/59
See application file for complete search history.

(56) References Cited

U.S. PATENT DOCUMENTS

| | | | |
|---|---|---|---|
| 2008/0270805 | A1 | 10/2008 | Kean |
| 2011/0313878 | A1 | 12/2011 | Norman |
| 2015/0120806 | A1 | 4/2015 | Lippincott |
| 2015/0379510 | A1 | 12/2015 | Smith |
| 2016/0098723 | A1 | 4/2016 | Feeney |
| 2016/0214324 | A1 | 7/2016 | Schouwenburg |
| 2016/0260169 | A1* | 9/2016 | Arnold ................ G06Q 20/023 |
| 2016/0261404 | A1* | 9/2016 | Ford .................... H04L 67/104 |
| 2017/0013047 | A1 | 1/2017 | Hubbard et al. |
| 2017/0041296 | A1 | 2/2017 | Ford et al. |
| 2017/0046526 | A1 | 2/2017 | Chan et al. |
| 2017/0115659 | A1* | 4/2017 | Kothari ............... G06Q 10/109 |
| 2018/0029298 | A1 | 2/2018 | Takaya et al. |
| 2018/0154578 | A1 | 6/2018 | Howell et al. |
| 2019/0020661 | A1 | 1/2019 | Zhang |

FOREIGN PATENT DOCUMENTS

| | | |
|---|---|---|
| JP | 2016170488 A | 9/2016 |
| KR | 101680260 B1 | 11/2016 |
| WO | 2016191151 A1 | 12/2016 |
| WO | 2017107976 A1 | 6/2017 |
| WO | 2017136879 A1 | 8/2017 |

OTHER PUBLICATIONS

Bahga, Arshdeep, et al.; "Blockchain Platform for Industrial Internet of Things", Journal of Software Engineering and Applications, vol. 9, pp. 533-546, Oct. 28, 2016.
International Search Report/Written Opinion; PCT/US2017/049685 dated Nov. 7, 2017; 15 pages.
EESR, Application No. 17923191.5-1222 / 3676676 (PCT/US2017049685), mailed Dec. 17, 2020, pp. 1-9.
Japanese Notice of Allowance; JP Application No. 2020-511469; dated Apr. 24, 2022.
Korean Office Action; KR Application No. 10-2020-7009014; dated Apr. 21, 2022.

\* cited by examiner

INTELLECTUAL PROPERTY EXCHANGE ECOSYSTEM FOR ADDITIVE MANUFACTURING

BACKGROUND

Some embodiments disclosed herein relate to industrial assets and, more particularly, to an intellectual property exchange ecosystem for the additive manufacture of industrial asset items.

A customer might want to obtain an industrial asset item, such as a nozzle for a jet engine, a replacement part for a wind turbine, etc. In some cases, the customer might be able to have the part created by one of a number of different additive manufacturing platforms. Note that different additive manufacturing platforms might have different item creation capabilities. For example, different platforms might utilize different three-dimensional printers, with different printing resolutions, different powders, etc. Moreover, different platforms might be associated with different prices, different turnaround times, etc. Selecting an appropriate additive manufacturing platform can be difficult and error-prone task for the customer. Likewise, an additive manufacturing platform might be unaware that a particular customer is interested in obtaining a particular item. Such problems can be especially difficult when there are a relatively large number of customer, items, and/or additive manufacturing platforms. In addition, customers might be wary of obtaining items that have not been produced in accordance with pre-determined requirements (e.g., poorly designed parts, counterfeit items, etc.). It would therefore be desirable to provide systems and methods to efficiently and accurately facilitate creation of an industrial asset item.

SUMMARY

According to some embodiments, a system may include an additive manufacturing platform that provides additive manufacturing capability data. A customer platform, associated with a customer, may transmit an industrial asset item request for an industrial asset item. A digital transaction engine may receive the additive manufacturing capability data and the industrial asset item request. The digital transaction engine may then associate the industrial asset item request with an industrial asset definition file, and, based on the additive manufacturing capability data and the industrial asset definition file, assign the industrial asset item request to the additive manufacturing platform. The assignment of the industrial asset item request may be recorded via a secure, distributed transaction ledger. Responsive to the assignment, the additive manufacturing platform may create the industrial asset item (e.g., via an additive manufacturing printer) and provide the item to the customer.

Some embodiments comprise: means for receiving, at a digital transaction engine from an additive manufacturing platform, an indication of additive manufacturing capability data; means for receiving, at the digital transaction engine from a customer platform, associated with a customer, an industrial asset item request for the industrial asset item; means for associating the industrial asset item request with an industrial asset definition file; based on the additive manufacturing capability data and the industrial asset definition file, means for assigning the industrial asset item request to the additive manufacturing platform; and means for recording the assignment of the industrial asset item request via a secure, distributed transaction ledger.

Technical effects of some embodiments of the invention may include improved and computerized ways to efficiently and accurately facilitate creation of an industrial asset item. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
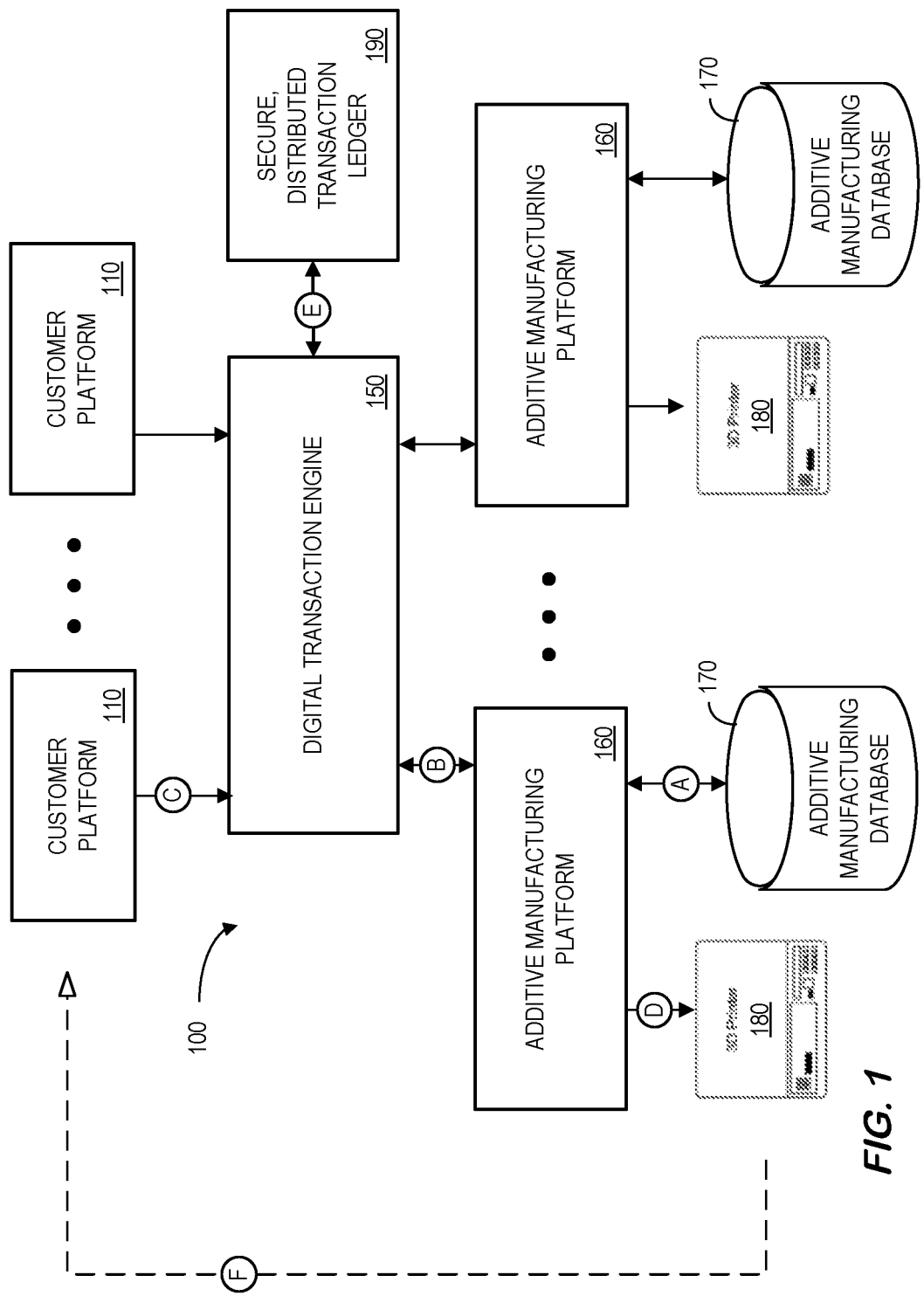
FIG. 1 is a high-level block diagram of a digital transaction system according to some embodiments.

It may generally be desirable to efficiently and accurately facilitate creation of an industrial asset item. FIG. 1 is a high-level block diagram of a system 100 according to some embodiments. In particular, the system 100 includes a digital transaction engine 150 with a communication port to exchange information with a number of customer platforms 110. According to some embodiments, the digital transaction engine 150 receives an industrial asset item request from one of the customer platforms 110 and assigns the request to one of a number of additive manufacturing platforms 160. Each additive manufacturing platform 160 might include and/or be associated with an additive manufacturing database 170 (e.g., storing a printer version number, a maximum resolution of a printer, powder specifics, a minimum turnaround time for a newly received job, etc.) and a three-dimensional printer 180. According to some embodiments, the digital transaction engine 150 and/or other elements of the system may then record information about the transaction using a secure, distributed transaction ledger 190 (e.g., via a blockchain verification process). For example, the digital transaction engine 150 might record an order date and time, a price, a bid, etc. via the secure, distributed transaction ledger 190 in accordance with any of the embodiments described herein. According to some embodiments, the distributed ledger might be associated with the HYPERLEDGER® blockchain verification system. Note that the digital transaction engine 150 could be completely de-centralized and/or might be associated with a third party, such as a vendor that performs a service for an enterprise.

The digital transaction engine 150, customer platform 110, and/or additive manufacturing platform 160 might be, for example, associated with a Personal Computer ("PC"), laptop computer, a tablet computer, a smartphone, an enterprise server, a server farm, and/or a database or similar storage devices. According to some embodiments, an "automated" digital transaction engine 150 may automatically provide a service for the customer platform 110 and record information via a distributed ledger (e.g., via a blockchain verification process). As used herein, the term "automated" may refer to, for example, actions that can be performed with little (or no) intervention by a human.

As used herein, devices, including those associated with the digital transaction engine 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The digital transaction engine 150 may store information into and/or retrieve information from data stores. The data stores might, for example, store electronic records representing prior transactions, transactions current in process, etc. The data stores may be locally stored or reside remote from the digital transaction engine 150. Although a single digital transaction engine 150 is shown in FIG. 1, any number of such devices may be included. Moreover, various devices described herein might be combined according to embodiments of the present invention. For example, in some embodiments, the digital transaction engine 150, data stores, and/or other devices might be co-located and/or may comprise a single apparatus.

In this way, the system 100 may efficiently and accurately facilitate creation of an industrial asset item. For example, at (A) the additive manufacturing platform 160 may obtain additive manufacturing capability data from the additive manufacturing database 170 and provide that information to the digital transaction engine 150 at (B). At (C), the customer platform 110 may transmit an industrial asset item request to the digital transaction engine 150. The digital transaction engine 150 may then assign the request one of the additive manufacturing platforms 160 (e.g., by transmitting a definition file to the platform 160 that was capable of producing the item at the lowest cost). The additive manufacturing platform 160 can then communicate with the three-dimensional printer 180 at (D) to initiate a printing process. Note that each step or subset of the steps of the transaction may be recorded in the secure, distributed transaction ledger 190 at (E). When created, the completed item may be provided to the customer at (F) (as illustrated by the dashed arrow in FIG. 1).

Figure 2:
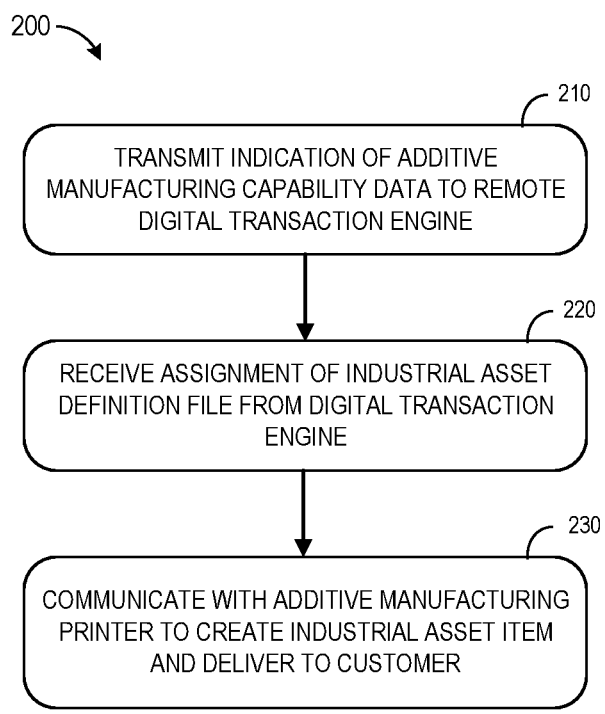
FIG. 2 is a method that may be associated with an additive manufacturing platform in accordance with some embodiments.

Note that the system 100 of FIG. 1 is provided only as an example, and embodiments may be associated with additional elements or components. According to some embodiments, the elements of the system 100 automatically facilitate creation of an industrial asset item for a customer. For example, FIG. 2 illustrates a method 200 that might be performed by the additive manufacturing platform 160 and/or other elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, the additive manufacturing platform may access an additive manufacturing database storing electronic records including additive manufacturing capability data. The additive manufacturing platform may then transmit an indication of the additive manufacturing capability data to a digital transaction engine (e.g., remote from the additive manufacturing platform). According to some embodiments, the additive manufacturing platform utilizes an additive manufacturing printer associated with three-dimensional printing. In this case, the capability data might be associated with a printer model, a resolution, a powder, a deadline, material specifications, process conditions, etc. As used herein, the phrase "additive manufacturing" may refer to various types of three-dimensional printing, including, for example, those described in the American Society for Testing and Materials ("ASTM") group "ASTM F42—Additive Manufacturing" standards. These include vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"), powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), and Directed Energy Deposition ("DED").

At 220, the additive manufacturing platform may receive an assignment of an industrial asset file from a digital transaction engine. In some cases, the assignment might result from a customer platform, associated with a customer, transmitting an industrial asset item request for an industrial asset item defined by the asset file. For example, the industrial asset file might comprise a Computer Aided Design ("CAD") file defining a three-dimensional "industrial asset" part (e.g., a gear, a fuel nozzle, etc.). As used herein, the phrase "industrial asset" might be associated with, for example, an engine, an aircraft, a locomotive, power generation, a wind turbine, etc. At 230, the additive manufacturing platform communicates with an additive manufacturing printer to create the industrial asset which can then be delivered to the customer.

Figure 3:
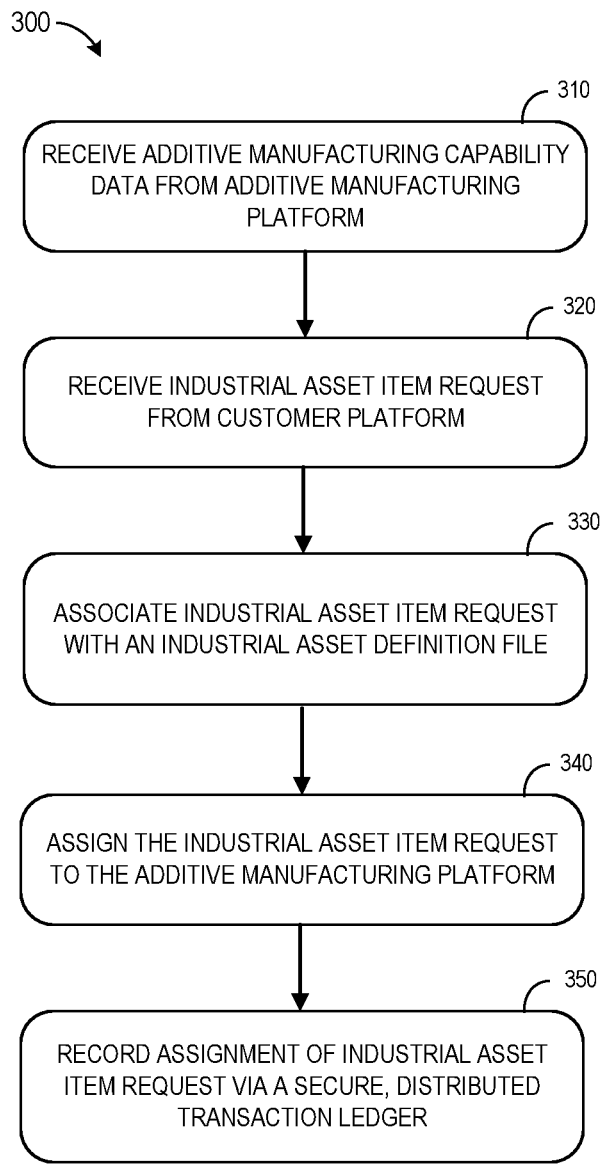
FIG. 3 is a method that may be associated with a digital transaction engine in accordance with some embodiments.

FIG. 3 is a method 300 that may be associated with the digital transaction engine 150 of FIG. 1 in accordance with some embodiments. At 310, the digital transaction engine may receive additive manufacturing capability data from one or more additive manufacturing platforms. Similarly, at 320 the digital transaction engine may receive one or more industrial asset item requests from one or more customer platforms. At 330, the digital transaction engine may associate a particular industrial asset item request with an industrial asset definition file. Note that the item request and/or the definition file might define, for example, exactly how the item needs to be created (e.g., the physical design, materials used, temperatures, tolerances, inspection requirements, turnaround time, price, etc.).

At 340, the digital transaction engine may, based on the additive manufacturing capability data and the industrial asset definition file, assign the industrial asset item request to a selected additive manufacturing platform. According to some embodiments, the digital transaction engine assigns the industrial asset item request to the selected additive manufacturing platform further based on a price, a deadline, a quantity (e.g., at least ten items might need to be delivered), a quality, a geographic location (e.g., the platform might need to be located within a pre-approved country).

In some embodiments, the digital transaction engine may record the assignment of the industrial asset item request via a secure, distributed transaction ledger at 350 (e.g., associated with blockchain technology). According to some embodiments, transactions recorded using blockchain technology might include information about an item quote, a bid, an award selection, manufacturing capability sharing, an engineering model generation, engineering model distribution, additive raw material procurement, supply, and readying, component manufacture, component inspection, component supply, a payment transaction (e.g., including micropayments and cryptographic payment systems such as bitcoin), etc.

According to some embodiments, a digital transaction engine communicates with a plurality of additive manufacturing platforms (at least some of which have differing additive manufacturing capability data) and/or a plurality of customer platforms requesting different industrial asset items. Note that a digital transaction engine might be associated with a single network cloud-hosted topology, a multiple network cloud-hosted topology, and/or a participant hosted intranet environment.

Figure 4:
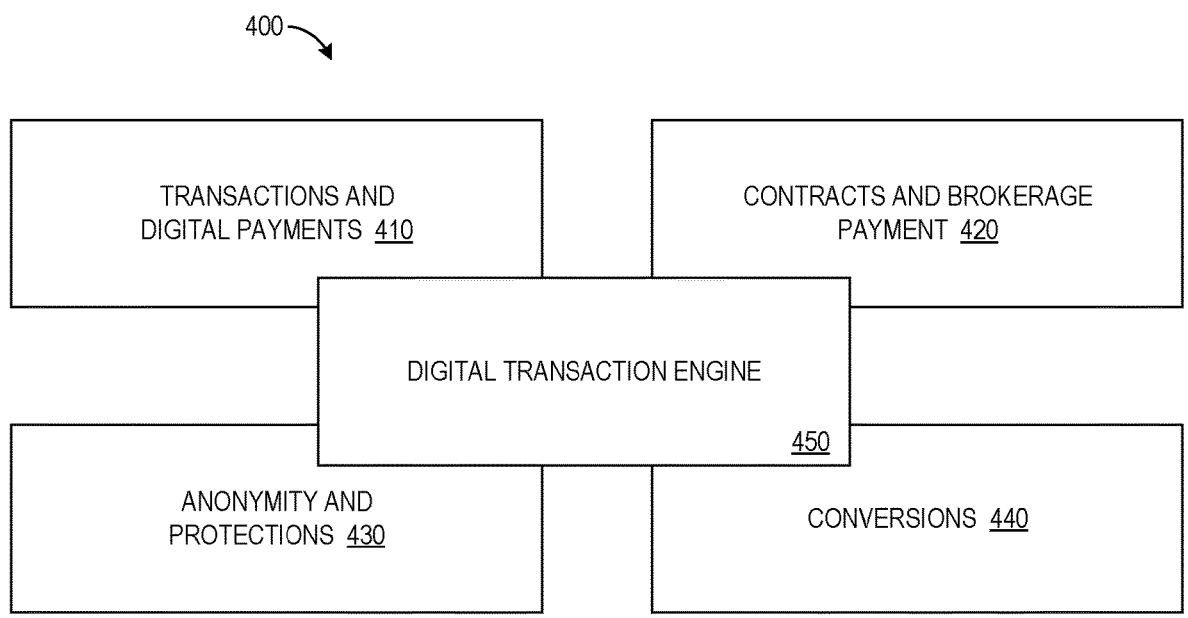
FIG. 4 illustrates elements of a phased approach to core digital transaction technology in accordance with some embodiments.

FIG. 4 illustrates elements of a phased approach 400 to core digital transaction technology in accordance with some embodiments. In particular, the approach 400 might initially provide for transactions and/or digital payments 410 for a digital transaction engine 450. This might provide the underlying structure of a digital ecosystem for the creation of industrial asset items. The approach 400 might then provide for smart contracts and/or brokerage payment 420 and anonymity and protections 430. For example, cryptocurrency might be used to create an opaque marketplace where identities are protected (as opposed to transparent marketplace). Finally, the conversions 440 may provide strong encryption for the precise control of advanced three-dimensional printing technologies, equipment, intellectual property, supply chain and pedigree histories, etc. As a result, counterfeit parts may be reduced and encrypted keys can be used to control access to equipment, build files, production volume and service contracts, etc. Mover, the system may be able to publish encrypted pedigree and transaction data to the distributed ledger to help control knowledge flow from design, modeling, simulation, and manufacture through contractual services. For example, certified build data (e.g., describing a build process or a three-dimensional printer manufacturer), certified design data (e.g., identifying a particular industrial asset item designer), and/or certified powder data (e.g., identifying an entity that supplied the powder used to create an industrial asset item).

Figure 5:
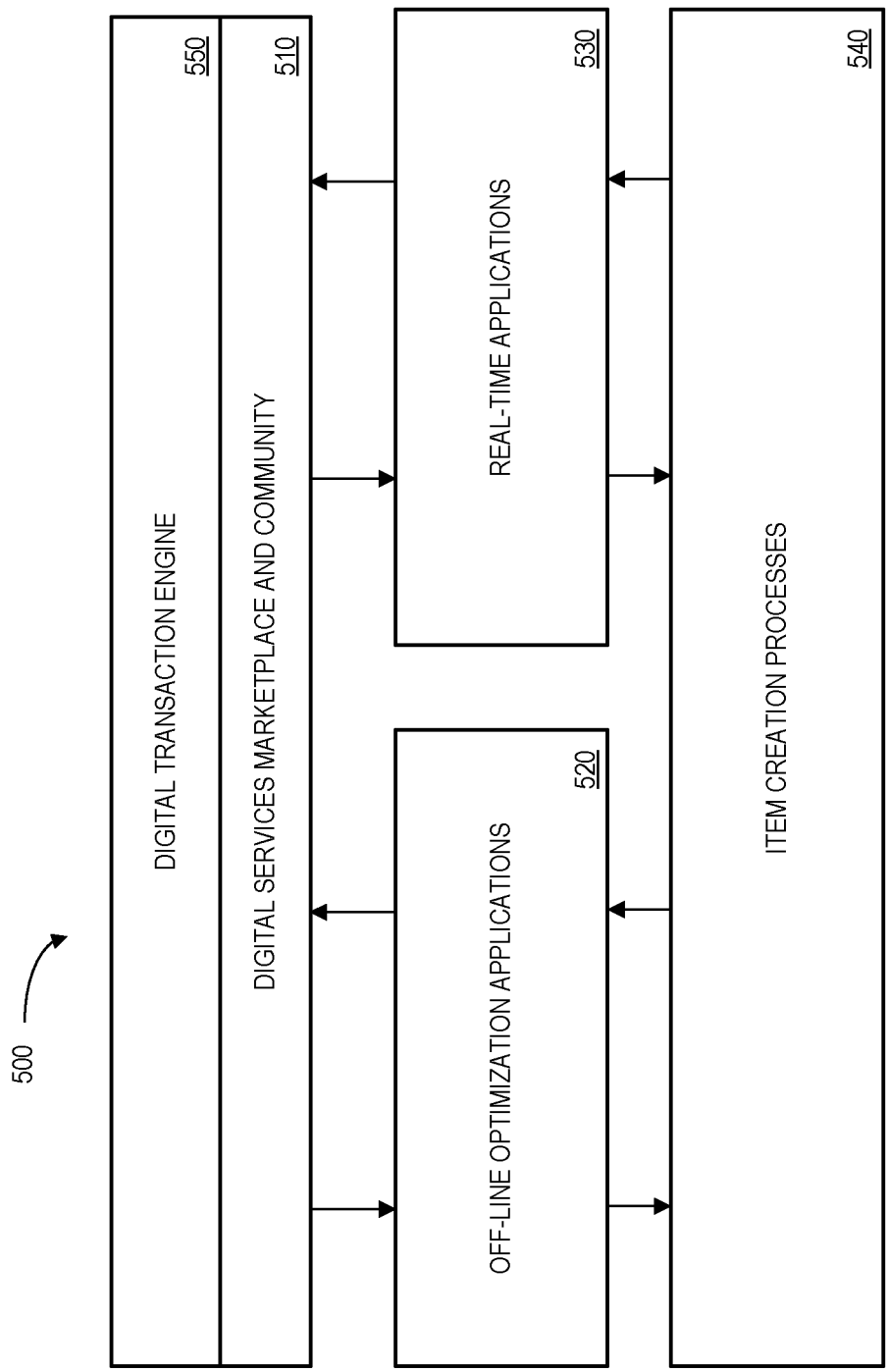
FIG. 5 is a block diagram of an additive digital ecosystem according to some embodiments.

FIG. 5 is a block diagram of an additive digital ecosystem 500 according to some embodiments. The ecosystem 500 includes a digital transaction engine 550 that communicates with off-line optimization applications 520 and real-time applications 530 via a digital services marketplace and community. The digital transaction engine 550 might be associated with, for example, a content distribution and access management toolchain, system-level optimization, and/or multi-disciplinary optimization. The off-line optimization applications 520 might include design applications, manufacturing planning applications, scan path generation applications, etc. The real-time applications 530 might include, for example, machine controls, in-line inspection, factory visualization, etc. Note that the off-line optimization applications 520 and/or real-time applications 530 might support various item creation processes such as design, manufacturing planning, scan path generation, build, in-line inspection, part creation, post-process inspection, etc. An item creation process 540 might interact, for example, with the off-line optimization applications 520 and/or real-time applications 530 to facilitate creation of an industrial asset item. In this way, the ecosystem 500 may provide improved outcomes (e.g., reducing design changes to a day or less, a self-optimized build process, individualized part lifing and performance, etc.).

Figure 6:
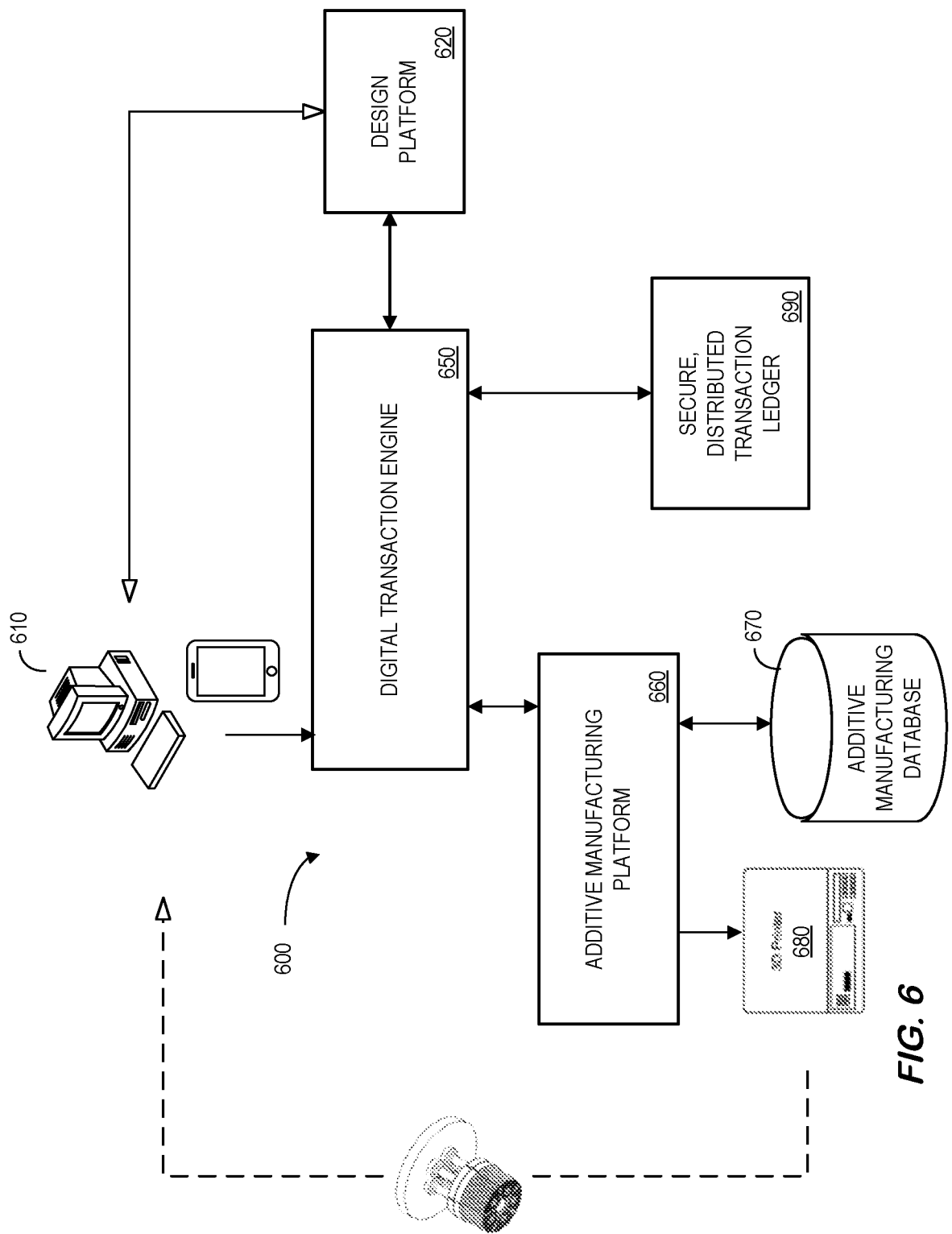
FIG. 6 is a high-level block diagram of a digital transaction system according to another embodiment.

FIG. 6 is a high-level block diagram of a digital transaction system 600 according to another embodiment. As before, a digital transaction engine 650 may receive an industrial asset item request from a customer platform 610. The digital transaction engine 650 may assign the request to an appropriate additive manufacture platform 660 having an additive manufacturing database 670 (e.g., locally storing capability information) and a three-dimensional printer 680. The printer 680 may then create the item so that it can be provided to the customer who requested it. Some or all of these steps might be recorded in a secure, distributed transaction ledger 690 (e.g., blockchain technology). Note that the secure, distributed transaction ledger 690 might be directly or indirectly coupled to other element of the digital transaction system 600 in addition to the digital transaction engine 650. In this embodiment, a design platform 620 might work with the customer to create an appropriate definition file for the item (e.g., an appropriate shape of the items, tools that need to be used to create the item, raw materials, etc.). According to some embodiments, the definition file may be encrypted with a cryptographic signature and/or include pedigree data. Note that the design platform 620 might provide multiple designs and/or definitions for a single item (e.g., different designs might be associated with different additive manufacturing processes, different printer models, etc.).

Figure 7:
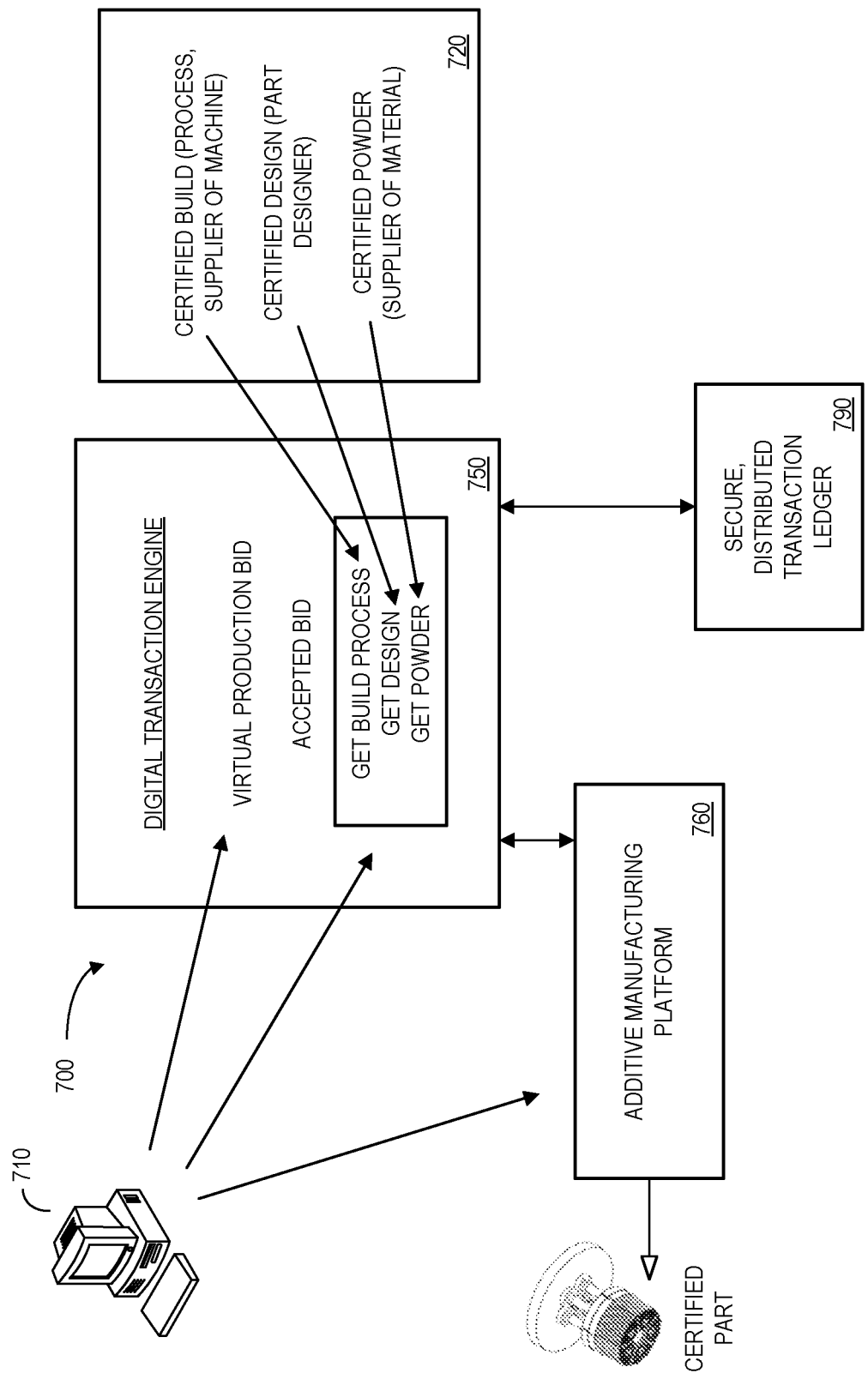
FIG. 7 is an additive part production chain enabled by a digital transaction engine in accordance with some embodiments.

FIG. 7 is an additive part production chain 700 enabled by a digital transaction engine in accordance with some embodiments. Again, a digital transaction engine 750 may receive an industrial asset item request from a customer platform 710. The digital transaction engine 750 may assign the request to an appropriate additive manufacture platform 760 to create the item so that it can be provided to the customer who requested it. Some or all of these steps might be recorded in a secure, distributed transaction ledger 790 (e.g., blockchain technology). Note that the customer might submit a "brokered buy" to the digital transaction engine 750 (which can then determine that a virtual production bid is accepted and used to initiate a build process, obtain the needed design, obtain required raw materials, etc.). In other embodiments, a customer might instead send a "direct buy" to the additive manufacturing platform 760. Moreover, in some embodiments, a design platform 720 may arrange for a certified build, design, powder, etc.

Thus, embodiments may facilitate distribution of intellectual property (e.g., engineering models and data packages for manufacture using additive manufacturing technology) facilitated by blockchain technology. Moreover, distributed ledger transactions may be used to effect and verify transactions between end users (e.g., customer, manufacturer, etc.) and seller/lessors of intellectual property (e.g., engineering models, technical data packages, processing conditions, inspection data, etc.) directly or through electronic intermediaries such as digital marketplaces. In addition, embodiments may provide a process for the distribution of electronic data files through a single transaction (or series of transactions) via the use of blockchain distributed ledger technology. According to some embodiments, two or more parties may use the distributed ledger technology to record the economic exchange of information necessary for the manufacture of additive manufactured components. For each intermediate step in the exchange of technical information (e.g., including: quote, bid or award selection; manufacturing capability sharing; engineering model generation; engineering model distribution; additive raw material procurement, supply and readying; component manufacture; component inspection; component supply; and payment) a corresponding transaction may be created. These transactions might be published in part (or in whole) to the distributed ledger in un-encrypted or encrypted form as a means of providing an online pedigree of the manufactured component to interested parties.

For a number of different reasons (such as the spread of industrially relevant additive manufacturing printing hardware, the increasing specification of additive manufacturing process to manufacture components, etc.) it may become economically advantageous to make available digital files (containing intellectual property) to end users for the manufacture of components that are not in-house or captive component suppliers. Therefore, it may be desirable to perform such transactions in a secure manner such that these digital engineering files and manufacturing process techniques remain secure. Creation of a digital ecosystem with strong encryption for the precise control of advanced three-dimensional printing technology, equipment, intellectual property, manufacturing, supply chain and pedigree histories based upon the use of a distributed ledger (e.g., a blockchain technology) may be provided in accordance with some embodiments described herein.

In order to protect the intellectual property required to manufacture components, requisite build files (e.g., engineering models, scan paths, etc.) and associated details (material specifications, lot data, machine specifications, process conditions, etc.) must be managed so as to secure the integrity of the data and limit theft (while still ensuring the production of high quality components using validated techniques). Finally, a validation mechanism may help verify authenticity of manufactured components while also protecting data rights.

Figure 8:
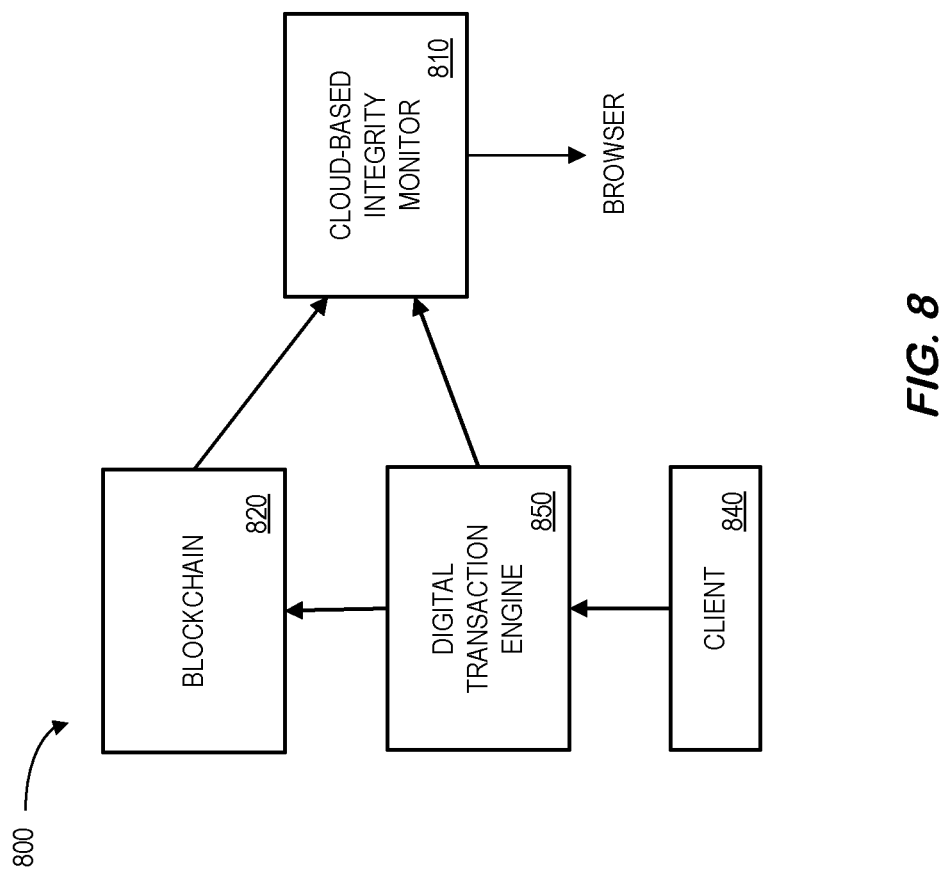
FIG. 8 is a system implementing a digital transaction with blockchain validation according to some embodiments.
Figure 9:
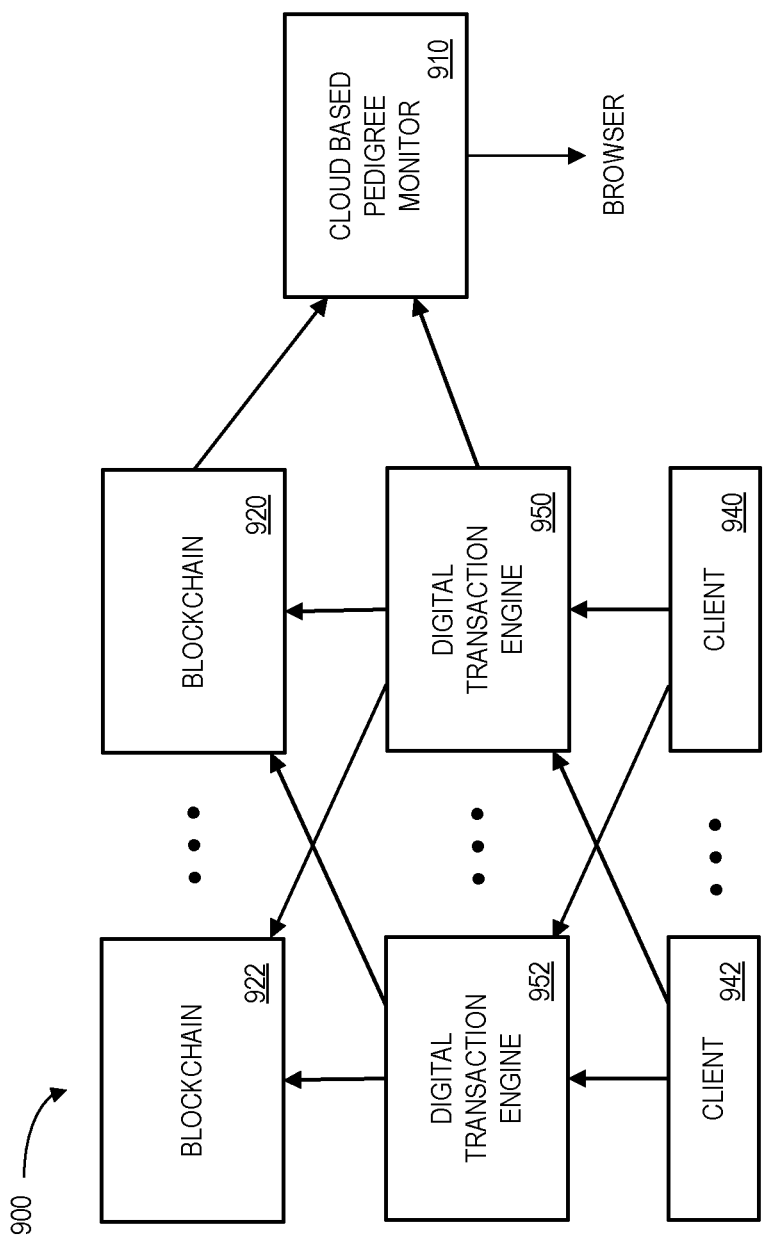
FIG. 9 is a system implementing a digital transaction with multiple digital transaction engines in accordance with some embodiments.

FIG. 8 is a system 800 implementing a digital transaction incorporating blockchain validation according to some embodiments. A cloud-based integrity monitor 810 may provide transaction integrity data via a web browser and exchange information with a blockchain 820 and a digital transaction engine 850 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the digital transaction engine 850 may be associated with a MySQL database. In this way, the digital transaction engine 850 and blockchain 820 can be used to provide transaction level verification for a client 840. Although FIG. 8 illustrates a system 800 with a single blockchain 820 and digital transaction engine 850, note that embodiments may employ other topologies. For example, FIG. 9 is a system 900 implementing a digital transaction incorporating multiple digital transaction engines in accordance with some embodiments. In particular, an additional blockchain 922 and digital transaction engine 952 may provide protection for an additional client 942. As illustrated in FIG. 9, each digital transaction engine 950, 952 may be associated with multiple blockchains 920, 922 providing additional protection for the system 900 (e.g., by storing information at multiple, geographically disperse nodes making attacks impractical). That is, each verifier (e.g., digital transaction engine) may commit a brief summary to an independent data store and, once recorded, the information cannot be changed without detection to provide a tamper-proof System of Records ("SoR").

Figure 10:
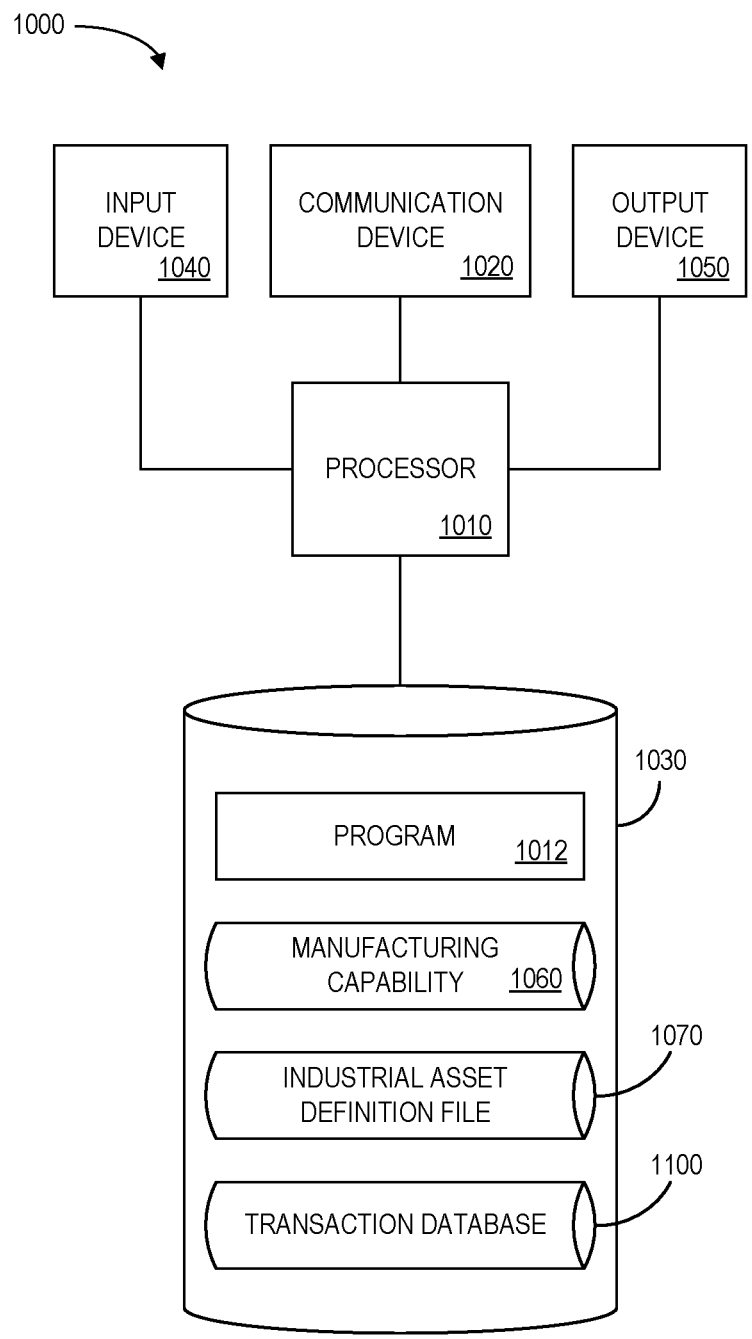
FIG. 10 illustrates a platform according to some embodiments.

Embodiments described herein may comprise a tool that facilitates creation of an industrial asset item and may be implemented using any number of different hardware configurations. For example, FIG. 10 illustrates a platform 1000 that may be, for example, associated with the systems 100, 1000 of FIGS. 1 and 10, respectively (as well as other systems described herein). The platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote platforms. Note that communications exchanged via the communication device 1020 may utilize security features, such as those between a public interne user and an internal network of an insurance enterprise. The security features might be associated with, for example, web servers, firewalls, and/or PCI infrastructure. The platform 1000 further includes an input device 1040 (e.g., a mouse and/or keyboard to enter information about a distributed ledger, a design file, etc.) and an output device 1050 (e.g., to output pedigree reports, generate production status messages, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or network security service tool or application for controlling the processor 1010. The processor 1010 performs instructions of the program 1012, and thereby operates in accordance with any of the embodiments described herein. For example, the processor 1010 may receive additive manufacturing capability data and an industrial asset item request. The processor 1010 may then associate the industrial asset item request with an industrial asset definition file, and, based on the additive manufacturing capability data and the industrial asset definition file, assign the industrial asset item request to a selected additive manufacturing platform. The assignment of the industrial asset item request may be recorded via a secure, distributed transaction ledger. Responsive to the assignment, the additive manufacturing platform may create the industrial asset item (e.g., via an additive manufacturing printer) and provide the item to the customer.

The program 1012 may be stored in a compressed, uncompiled and/or encrypted format. The program 1012 may furthermore include other program elements, such as an operating system, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as shown in FIG. 10), the storage device 1030 further stores manufacturing capability information 1060, industrial asset definition files 1070, and a transaction database 1100. An example of a database that might be used in connection with the platform 1000 will now be described in detail with respect to FIG. 11. Note that the database described herein is only an example, and additional and/or different information may be stored therein. Moreover, various databases might be split or combined in accordance with any of the embodiments described herein. For example, the transaction database 1100 and industrial asset definition files 1070 might be combined and/or linked to each other within the program 1012.

Figure 11:
FIG. 11 is a portion of a tabular transaction database in accordance with some embodiments.

Referring to FIG. 11, a table is shown that represents the transaction database 1100 that may be stored at the platform 1000 in accordance with some embodiments. The table may include, for example, entries identifying transactions associated with the creation of items for customers. The table may also define fields 1102, 1104, 1106, 1108, 1110, 1112, 1114 for each of the entries. The fields 1102, 1104, 1106, 1108, 1110, 1112, 1114 may, according to some embodiments, specify: transaction identifier 1102, a customer platform identifier 1104, a date and time 1106, a status 1108, a blockchain result 1110, a printer identifier 1112, and an industrial asset definition file 1114. The transaction database 1100 may be created and updated, for example, based on information electrically received from remote customer platforms, additive manufacturer platforms, and/or distributed ledger devices.

The transaction identifier 1102 may be, for example, a unique alphanumeric code identifying a transaction (or sub-step of a transaction) being executed by a digital transaction engine. The customer platform identifier 1104 might indicate the customer who initiated the transaction by requesting the part. The date and time 1106 might indicate when the particular sub-step was completed and recorded in a ledger. The status 1108 might indicate if the transaction is in-process or has been completed. The blockchain result 1110 might indicate whether or not the information has been verified via a distributed ledger. Note that other techniques could be used in additional to, or instead of, a blockchain process (and may or may not be included in the transaction database 1100). The printer identifier 1112 might indicate which device is going to create (or has created) the industrial asset item, and the industrial asset definition file 1114 might contain a CAD file or link to a location where information defining the item is stored.

Figure 12:
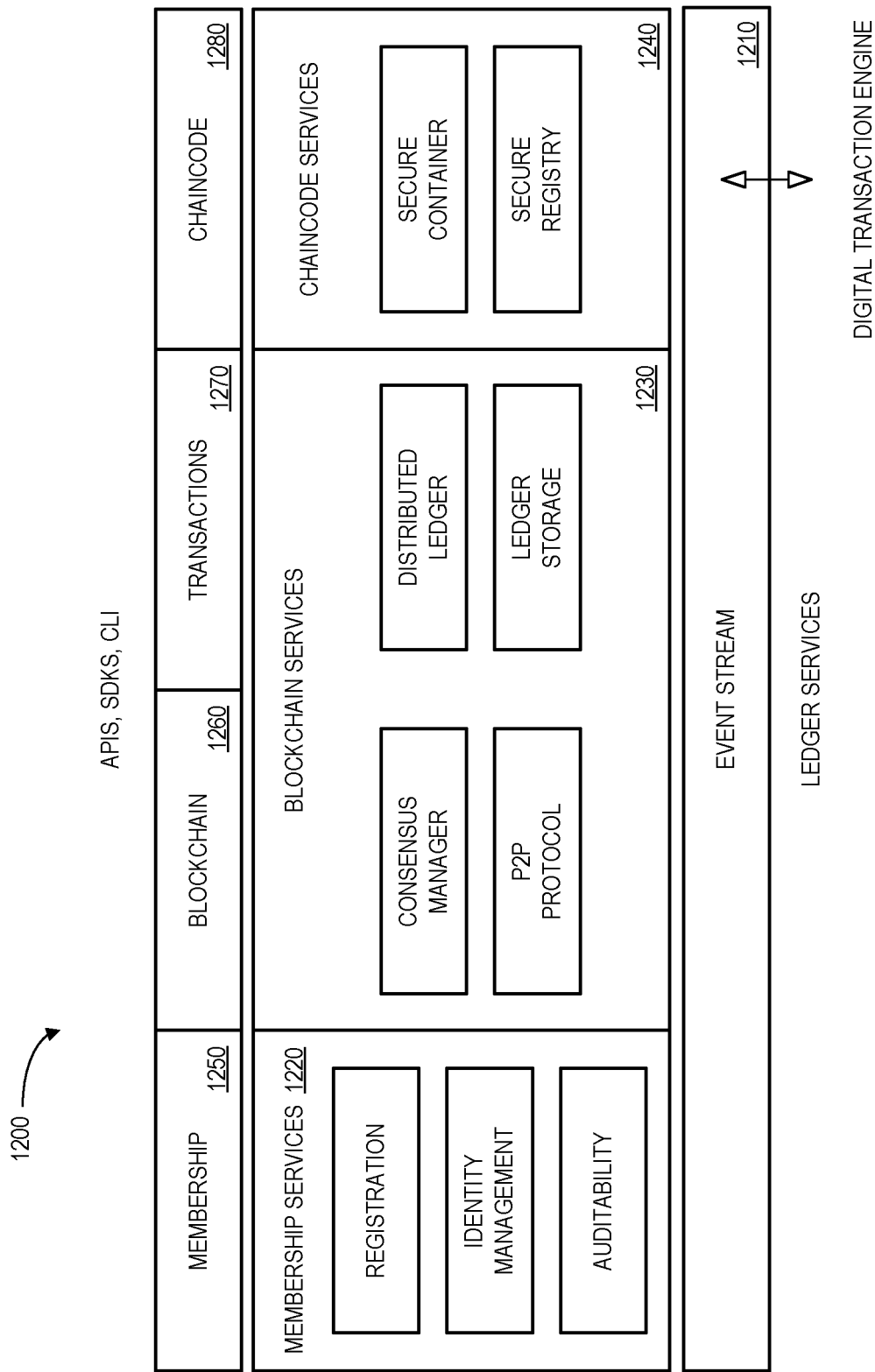
FIG. 12 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 12 is a distributed ledger reference architecture 1200 according to some embodiments. The architecture 1200 includes ledger services and an event stream 1210 that may contain network security service information (e.g., from a digital transaction engine). Membership services 1220 (e.g., including registration, identity managements, and/or an auditability process) may manage identity, privacy, and confidentially for membership 1250 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 1260 and transactions 1270. Chaincode services 1240 (e.g., secure container and/or a secure registry associated with a smart contract) may help compartmentalize smart contract (or chaincode 1280) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1200.

Thus, some embodiments described herein may use blockchain technology to allow for the economic creation and distribution of engineering models required for manufacture in an advantageous manner. In addition, the creation of an independently verifiable pedigree viewable by accessing an online transaction record (as provided by the blockchain) may help eliminate counterfeit parts.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
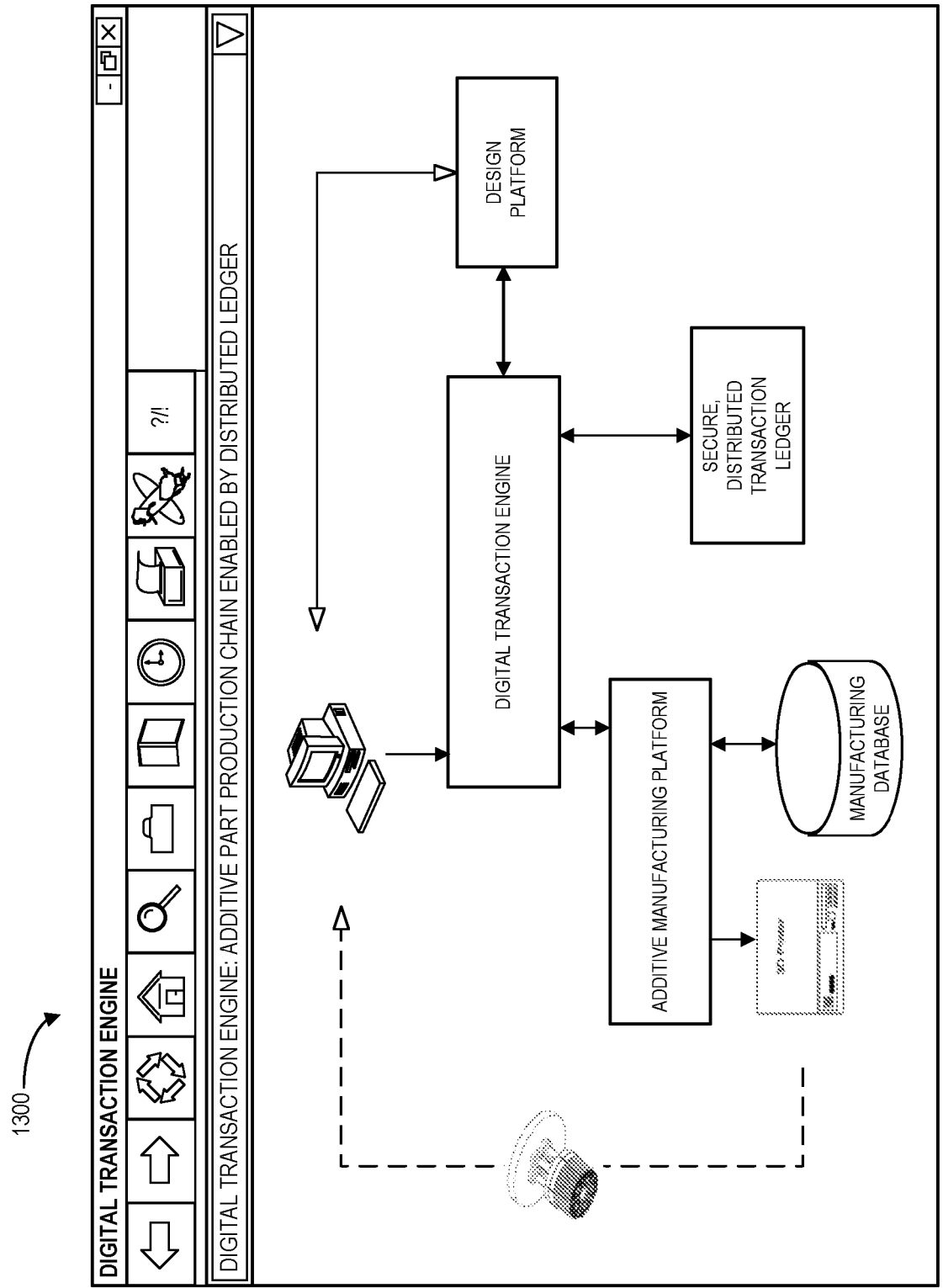
FIG. 13 illustrates a computer display in accordance with some embodiments.
Figure 14:
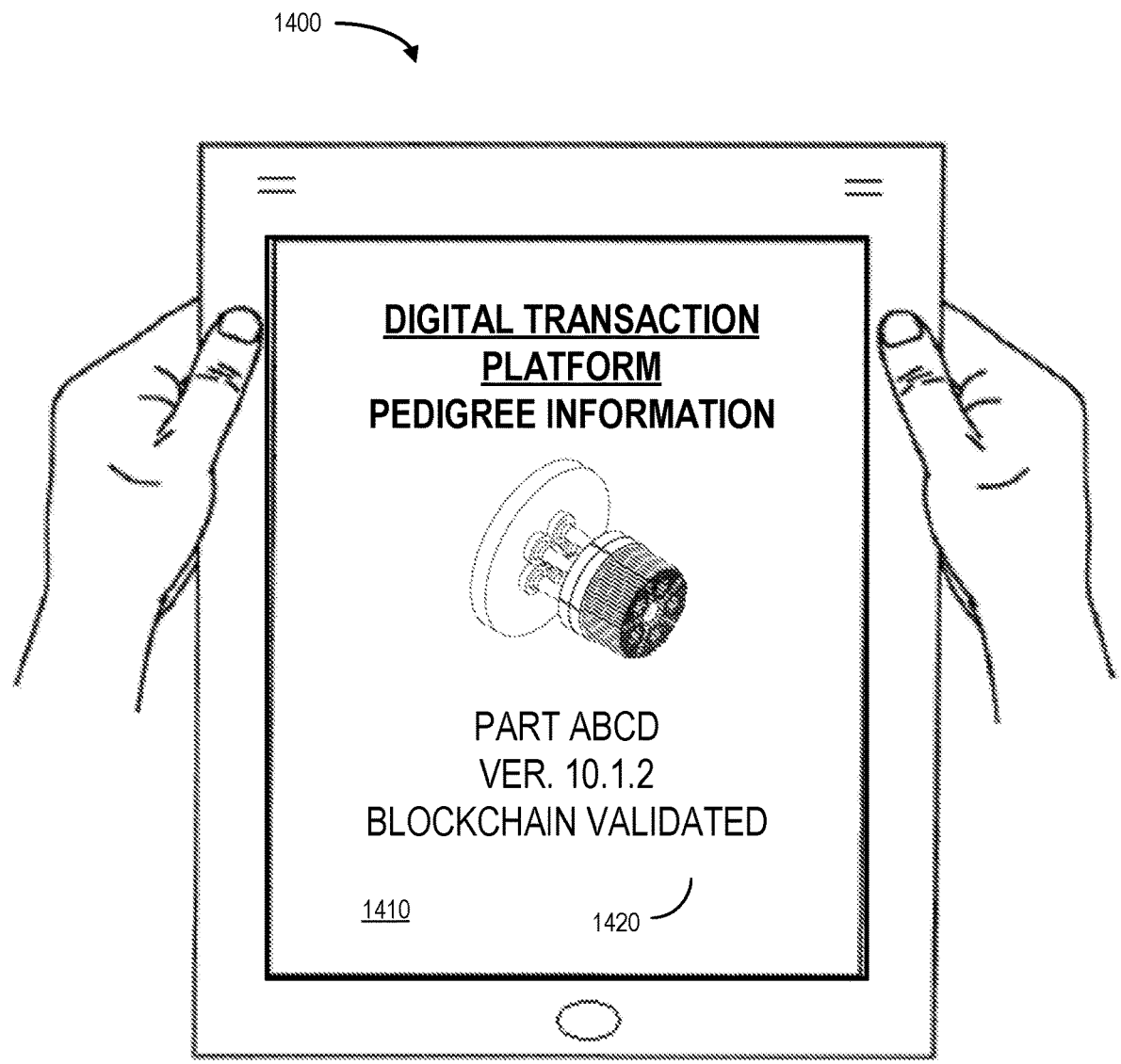
FIG. 14 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial control systems, note that embodiments might be associated with other types of computing systems, including non-industrial control systems and processors in general. Similarly, the displays shown and described herein are provided only as examples, and other types of displays and display devices may support any of the embodiments. For example, FIG. 13 illustrates a digital transaction engine display 1300 that might utilize an interactive graphical user interface. The display 1300 might comprise a graphical overview of the devices associated with the item creation process and selection of an element on the display 1300 might result in further information about that element. As another example, FIG. 14 illustrates a tablet computer 1400 providing a pedigree information display 1410 according to some embodiments. In particular, the pedigree information display 1410 may be an interactive user interface (e.g., via a touchscreen) and includes a blockchain validation status 1420 in accordance with any of the embodiments described herein.

Figure 15:
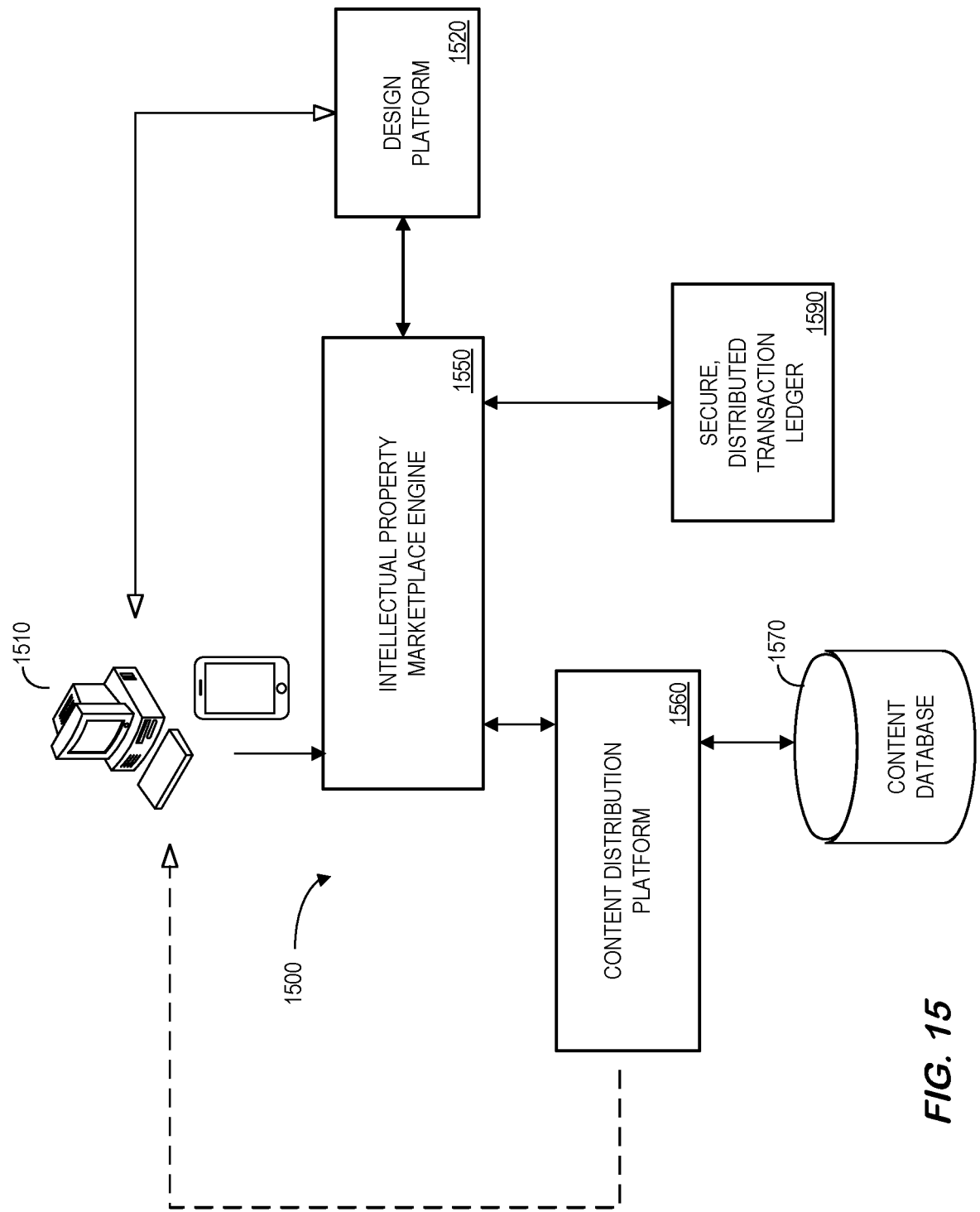
FIG. 15 is a high-level block diagram of an intellectual property marketplace system in accordance with some embodiments.

Although embodiments have been described in connection with the creation of industrial asset items for customers, note that embodiments might instead be utilized to facilitate a spread and/or sale of information. For example, FIG. 15 is an intellectual property marketplace system 1500 in according with another embodiment. In this example, an intellectual property marketplace engine 1550 may receive an intellectual property request from a customer platform 1510. The intellectual property marketplace engine 1550 may assign the request to an appropriate content distribution platform 1560 having a locally stored content database 1570 (e.g., storing capability information). The content distribution platform 1560 can retrieve content from the content database 1570 and transmit it to the customer platform. Some or all of these steps might be recorded in a secure, distributed transaction ledger 1590 (e.g., blockchain technology). In this embodiment, a design platform 1520 might work with the customer and/or content distribution platform to create an appropriate definition file for the item (e.g., a database query, a selection of an entertainment program, etc.). According to some embodiments, the definition file may be encrypted with a cryptographic signature and/or include pedigree data. Note that the design platform 1520 might provide multiple designs and/or definitions for a single item (e.g., different designs might be associated with different content distribution platforms 1560, client viewing devices, etc.). Note that intellectual property request might be associated with, by ways of examples only, an entertainment program, a database search result (e.g., with more specific results costing more as compared to less specific queries), consumer information (e.g., activity tracking data gathered by a large number of people wearing fitness devices), health information (e.g., the results of a health study collecting data from a substantial number of patients), etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate creation of an industrial asset item, comprising:
a plurality of additive manufacturing platforms, each including:
an additive manufacturing database storing electronic records including additive manufacturing capability data;
an additive manufacturing communication port configured to exchange information with a digital transaction engine; and
an additive manufacturing computer processor coupled to the additive manufacturing communication port and adapted to:
transmit an indication of the additive manufacturing capability data to the digital transaction engine;
receive an assignment from the digital transaction engine; and
communicate, via the additive manufacturing communication port, with an additive manufacturing printer to initiate a printing process for creation of the industrial asset item based on the assignment;
a customer platform, associated with a customer, to transmit an industrial asset item request for manufacturing the industrial asset item; and
the digital transaction engine, including:
a digital transaction communication port configured to exchange information with the plurality of additive manufacturing platforms and the customer platform, and
a digital transaction engine computer processor coupled to the digital transaction communication port and adapted to:
receive the additive manufacturing capability data from each of the plurality of additive manufacturing platform;
receive the industrial asset item request from the customer platform;
associate the industrial asset item request with an industrial asset definition file;
based on the additive manufacturing capability data associated with each of the plurality of additive manufacturing platforms and the industrial asset definition file, select an additive manufacturing platform from the plurality of additive manufacturing platforms;
assign the industrial asset item request to the selected additive manufacturing platform to initiate the printing process for creation of the industrial asset item; and
record the assignment of the industrial asset item request and the creation of the industrial asset item via a secure, distributed transaction ledger.

2. The system of claim 1, wherein each of the plurality of additive manufacturing platforms further comprises:
a respective additive manufacturing printer associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

3. The system of claim 2, wherein the additive manufacturing computer processor of the is further adapted to:
responsive to the assignment, communicate data associated with the industrial asset definition file to the additive manufacturing printer to facilitate creation of the industrial asset item.

4. The system of claim 3, wherein the additive manufacturing computer processor is further adapted to:
arrange for delivery of the industrial asset item to the customer.

5. The system of claim 1, wherein the secure, distributed transaction ledger comprises blockchain technology.

6. The system of claim 5, wherein transactions recorded using blockchain technology are associated with at least one of: (i) a quote, (ii) a bid, (iii) an award selection, (iv) manufacturing capability sharing, (v) an engineering model generation, (vi) engineering model distribution, (vii) additive raw material procurement, supply, and readying, (viii) component manufacture, (ix) component inspection, (x) component supply, and (xi) payment.

7. The system of claim 1, wherein the digital transaction engine communicates with a plurality of customer platforms requesting different industrial asset items.

8. The system of claim 1, further comprising:
a design platform to create the industrial asset definition file, wherein the industrial asset definition file is encrypted with a cryptographic signature and includes pedigree data.

9. The system of claim 1, wherein the digital transaction engine assigns the industrial asset item request to the selected additive manufacturing platform further based on at least one of: (i) a price, (ii) a deadline, (iii) a quantity, (iv) a quality, and (v) a geographic location.

10. The system of claim 1, wherein the additive manufacturing capability data is associated with at least one of: (i) a printer model, (ii) a resolution, (iii) a powder, (iv) a deadline, (v) material specifications, and (vi) process conditions.

11. The system of claim 1, wherein the customer platform is associated with at least one of: (i) a personal computer, (ii) a tablet computer, (iii) a server computer, and (iv) a smartphone.

12. The system of claim 1, wherein the digital transaction engine is associated with at least one of: (i) a single network cloud-hosted topology, (ii) a multiple network cloud-hosted topology, and (iii) a participant hosted intranet environment.

13. The system of claim 1, wherein the industrial asset item is associated with at least one of: (i) an engine, (ii) an aircraft, (iii) a locomotive, (iv) power generation, and (v) a wind turbine.

14. A computer-implemented method to facilitate creation of an industrial asset item, comprising:
receiving, at a digital transaction engine and from a plurality of additive manufacturing platforms, a plurality of indications each associated with additive manufacturing capability data corresponding to a respective additive manufacturing platform of the plurality of additive manufacturing platforms;
receiving, at the digital transaction engine and from a customer platform associated with a customer, an industrial asset item request for the industrial asset item;
associating the industrial asset item request with an industrial asset definition file;
based on the additive manufacturing capability data corresponding to each respective additive manufacturing platform of the plurality of additive manufacturing platforms and the industrial asset definition file, selecting an additive manufacturing platform from the plurality of additive manufacturing platforms;
assigning the industrial asset item request to the selected additive manufacturing platform to initiate a printing process for creation of the industrial asset item; and
recording the assignment of the industrial asset item request and the creation of the industrial asset item via a secure, distributed transaction ledger.

15. The method of claim 14, wherein the additive manufacturing capability data is associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

16. The method of claim 15, wherein the secure, distributed transaction ledger comprises blockchain technology.

17. The method of claim 16, wherein transactions recorded using blockchain technology are associated with at least one of: (i) a quote, (ii) a bid, (iii) an award selection, (iv) manufacturing capability sharing, (v) an engineering model generation, (vi) engineering model distribution, (vii) additive raw material procurement, supply, and readying, (viii) component manufacture, (ix) component inspection, (x) component supply, and (xi) payment.

18. The method of claim 14, wherein the digital transaction engine communicates with a plurality of customer platforms requesting different industrial asset items.

19. The system of claim 1, wherein assigning the industrial asset item request comprises transmitting the industrial asset definition file to the selected additive manufacturing platform.

20. The system of claim 8, wherein the industrial asset definition file is created by the design platform via a database query.

21. The system of claim 1, wherein the industrial asset item request or the industrial asset definition file defines at least one of: (i) a physical design, (ii) materials used, (iii) temperatures, (iv) tolerances, (v) inspection requirements, (vi) turnaround time, and (vii) price.

22. The method of claim 14, wherein the industrial asset definition file is created by a design platform via querying a database.

* * * * *